United States Patent [19]

Felleisen et al.

[11] 4,423,454

[45] Dec. 27, 1983

[54] MAGNETIC RECORDING DISK

[75] Inventors: Peter Felleisen, Lampertheim; Dieter Mayer, Ludwigshafen; Eberhard Koester, Frankenthal; Friedrich Domas, Altlussheim; Paul Deigner, Willstaett, all of Fed. Rep. of Germany

[73] Assignee: BASF Aktiengesellschaft, Ludwigshafen, Fed. Rep. of Germany

[21] Appl. No.: 163,400

[22] Filed: Jun. 26, 1980

[30] Foreign Application Priority Data

Jul. 12, 1979 [DE] Fed. Rep. of Germany ....... 2928096

[51] Int. Cl.³ .......................... G11B 5/70; G11B 5/82
[52] U.S. Cl. .................................. 360/135; 360/131; 427/131; 428/900
[58] Field of Search ...................... 360/131, 134, 135; 427/131, 130; 428/65, 900

[56] References Cited

U.S. PATENT DOCUMENTS

| 4,075,384 | 2/1978 | Suzuki et al. | 360/131 X |
| 4,091,158 | 5/1978 | Kasuga et al. | 360/134 X |
| 4,277,809 | 7/1981 | Fisher | 360/131 |
| 4,287,544 | 9/1981 | Lazzari | 360/131 |

FOREIGN PATENT DOCUMENTS 1416495 12/1975 United Kingdom ............... 360/131

*Primary Examiner*—John H. Wolff
*Attorney, Agent, or Firm*—Keil & Witherspoon

[57] ABSTRACT

A magnetic recording disk comprising a non-magnetic substrate and two or more firmly adhering magnetizable layers applied to one or both sides thereof, the layer located directly on the substrate being magnetically isotropic, while the second layer and any additional layers exhibit orientation of the anisotropic magnetic particles parallel to the substrate and to the envisaged recording direction.

3 Claims, 2 Drawing Figures

MAGNETIC RECORDING DISK

BACKGROUND OF THE INVENTION AND PRIOR ART

The present invention relates to a magnetic recording disk comprising a non-magnetic substrate and two or more firmly adhering magnetizable layers, consisting in particular of an anisotropic magnetic material finely dispersed in an organic binder, applied to one or both sides of the substrate.

The recording of information, especially in the field of data processing, in concentric tracks on rigid or flexible magnetic disks is known (Great Britain Pat. No. 1,416,495).

Such recording media are usually produced by applying a dispersion of a particulate anisotropic magnetic material, e.g. acicular gamma-iron(III) oxide, in a solution of an organic binder, also containing suitable additives, to the substrate. In the case of rigid disk memories the dispersion is usually applied to aluminum disks by the spin-coating process (U.S. Pat. No. 3,198,657), whilst flexible magnetic disks are punched out of a web of base film coated with the dispersion (Great Britain Pat. No. 1,416,495). In these recording media, the anisotropic magnetic particles are either unoriented or circularly oriented (German Laid-Open Application DOS No. 2,304,311) and Great Britain Pat. No. 1,416,495.

As is well known, alignment of the anisotropic magnetic particles in the recording layer increases the remanent magnetization in the direction of orientation (see U.S. Pat. No. 4,277,809 at column 1, lines 14 through 46), as a result of which a higher output signal level in the recording direction is achieved. This is why, in the case of magnetic recording tapes, the particles are oriented in the envisaged recording direction.

However, when an unoriented magnetic coating is compared with an oriented coating of the same thickness, it is found that the ratio of the recorded signal at high frequencies, i.e. at high recording densities, to that at low frequencies, i.e. at low recording densities, is higher in the case of the un-oriented coating. This effect can only be compensated for by reducing the thickness of the coating. It has also been proposed in U.S. Pat. Nos. 3,185,775 and 3,052,567, and Austrian Pat. No. 224,357 to orient the anisotropic particles, within a dual-layer magnetic coating, in such a way that their easy axis is substantially parallel to the field lines in front of the recording head (see also U.S. Pat. No. 4,287,544 at column 1, lines 16 through 18). This means that the particles in the layer which is remote from the magnetic head are oriented in the recording direction and parallel to the base, whilst the particles in the upper layer are virtually at right angles to the base. With this method it was possible to substantially broaden the frequency range of magnetic recording media for analog recording, especially in the audio sector. However, the same considerations do not apply to the recording of digital information. A decrease in the output signal level is undesirable here; if this decrease is brought about by a reduction in the thickness of the coating, there is usually a substantial increase in the number of defects in the coating. Furthermore, in the case of thin coatings, the surfaces are difficult to process in the manner usually used in the case of magnetic disks to achieve the requisite planeness and slight surface roughness, without the occurrence of flaws in the coating (see generally U.S. Pat. No. 4,277,809 at column 1, lines 18 through 38). On the other hand, a non-oriented magnetic layer has the advantage over an oriented layer of the same thickness that it exhibits much better frequency response characteristics. However, a disadvantage is the very low read signal, which causes a worsening of the signal/noise ratio by a factor of about 2. This in turn means that the number of errors increases, since the noise pulses produce phase errors in the read signal. This is particularly critical in the case of the innermost tracks of a magnetic recording disk, where the recording density is highest and the relative speed between the head and the disk is lowest, i.e. the read signal, especially a high-frequency read signal, is weakest.

OBJECT OF THE INVENTION

It is an object of the present invention to provide magnetic recording disks which do not have the disadvantages described above and which in particular exhibit both a high 2F read signal, i.e. a signal of the highest frequency in FM and MFM recording processes, and also a high resolution, i.e. a high ratio of 2F signal to 1F signal, in the case of a relatively thick magnetic coating.

We have found that this object is achieved and that magnetic recording disks comprising a non-magnetic substrate and at least two firmly adhering magnetizable layers applied to one or both sides thereof possess the required properties if the layer located directly on the substrate is magnetically isotropic, whilst the second layer exhibits orientation of the anisotropic magnetic particles parallel to the substrate and to the envisaged recording direction.

In particular, the invention relates to magnetic recording disks which possess, on one or both sides of the substrate, more than two magnetizable layers consisting of an anisotropic magnetic material finely dispersed in a polymeric binder also containing conventional additives, the layer located directly on the base being magnetically isotropic, i.e. the magnetic particles are dispersed substantially at random, so that there is no magnetic preferred direction, whilst the upper magnetizable layers exhibit circular orientation of the magnetic particles, the orientation ratio improving upwardly from layer to layer.

According to the invention it is particularly advantageous if two magnetizable layers are present on each side of the recording disk and the lower layer, which is adjacent to the base, does not have a magnetic preferred direction, whilst the upper has a circular preferred direction.

With the novel recording media a layer or a plurality of layers, exhibiting orientation of the magnetic particles in the recording direction, is/are thus available for the recording of high frequencies, to which only the upper zones of a magnetizable coating contribute; accordingly, the remanent magnetization is greater than in the case of a non-oriented layer. The lower frequencies of the recorded signals are preferably stored in the zones of the magnetizable coating which are more remote from the magnetic head and which, since they do not exhibit orientation of the magnetic particles, contribute less to the subsequent read signal level. This means that a higher ratio of high to low frequencies is achieved, i.e. the novel recording medium gives better resolution of the stored information, accompanied by a good frequency response in spite of the fact that the magnetic coating has a relatively large total thickness, which offers advantage with respect to the number of errors and the requisite surface finishing. The effect is particularly advantageous in the case of the innermost concentric tracks of recording disks, since there the speed of the magnetic head relative to the recording medium is lowest and hence the recording density is highest. In the prior art, the read signal, especially a high-frequency read signal, was lowest in these tracks.

Digital data are usually recorded by the FM method (also referred to as 2-frequency recording) or the MFM method (also referred to as 3-frequency recording). In the FM method, the position of a flux change in a bit cell, which is generated by the recording itself, is allotted one of the two binary digits 0 and 1. A flux change at the beginning of a bit cell, referred to as a clock pulse, corresponds to a '0' bit, and an additional flux change in the middle of a bit cell, referred to as a data pulse, corresponds to a '1' bit. The name 2-frequency recording originates from the fact that in this process 2 frequencies can occur, namely the frequency 1F in a stream of '0' bits and the double frequency 2F in a stream of '1' bits.

In MFM recording, in a stream of '0' bits each bit cell starts with a clock pulse. However, in a stream of '1' bits, the clock pulses at the beginning of the bit cells are absent and only data pulses in the middle of each bit cell are recorded. Accordingly, the same frequency 2F results in both cases. Since, however, only one clock pulse is recorded when two '0' bits follow one another, but there is no clock pulse when a '0' bit is followed by a '1' bit, the frequency 1F results in the case of an alternating sequence of '0' and '1' bits in which only data pulses of frequency 1F occur. A third frequency, 1.5F, results if a '1' bit is followed by two '0' bits and this sequence is continued.

The novel recording media are produced in a conventional manner. The desired effect can be achieved with both flexible and rigid magnetic recording disks. The special features of the production of these recording media are known.

Rigid magnetic disks consist of a substrate, namely a circular disk of an aluminum alloy having a circular hole in the middle, and a magnetic coating applied to the ground and lapped surfaces thereof. This coating is produced by applying a dispersion of a magnetic material, in most cases acicular gamma-iron(III) oxide, having an average particle length of from 0.1 to 2 $\mu$m, in a curable organic binder. Particularly suitable binders, which are advantageously employed as a solution or as a solution of their components, are those possessing reactive epoxy groups, more especially the polyglycidyl ethers of aliphatic and aromatic polyols, e.g. of glycerol, 1,4-butanediol, 2,2-bis-(hydroxymethyl)-propane, pentaerythritol, bisphenol A (2,2-bis-(4-hydroxyphenyl)-propane), bis-(4-hydroxyphenyl)-methane and the like, which can be obtained by reacting the particular polyol with epichlorohydrin and are commercially available as surface-coating binders. They can be cured at elevated temperatures, for example by means of polyamines, polyaminoamides, plasticized or unplasticized phenolic resins of the resol type, curable urea-formaldehyde precondensates or curable melamine-formaldehyde precondensates, whose methylol groups can also be etherified with lower alcohols. Of course, the magnetic layers may also contain the usual small amounts of conventional additives, for example dispersants or lubricants. To prepare the dispersion, the mixture of magnetic material, curable binder and a sufficient amount of solvent is dispersed by a conventional method, for example in a ball mill. A conventional method can also be used to apply the dispersion to the base disk. It has proved very advantageous first to apply a layer of the dispersion to the base disk whilst it is rotating slowly, for example at from about 100 to 500 rpm, and then to obtain the required thickness of the layer by rotating the disk at a higher speed, preferably at from about 1,000 to 3,000 rpm. A coating technique which may be used is described in U.S. Pat. No. 2,913,246. Usually the base disks are provided with a magnetic layer on each side. Thereafter, these layers of dispersion are dried by evaporating the solvent. The second and any further layers are then applied in the same manner, and the magnetic particles are circularly oriented in a conventional manner by means of a magnetic field while the dispersion is still fluid. Methods of orientation are described, for example, in German Laid-Open Application DOS No. 2,357,517 and U.S. Pat. No. 4,001,463. The binder of the magnetic layer is then cured at an elevated temperature. Advantageously, the surfaces of the resulting magnetic coatings are brought to the requisite average peak-to-valley height by grinding and polishing.

In place of magnetizable layers based on magnetic particles finely dispersed in an organic binder, the novel recording media may carry layers of a ferromagnetic metal. The production of such layers is well known (cf., e.g., German Laid-Open Application DOS No. 2,512,456), as is the production of such layers having a magnetic preferred direction (e.g. German Laid-Open Application DOS No. 1,952,627).

The method of producing flexible recording disks differs from the conventional method. They are produced, not by punching out a web of base film bearing a magnetic layer, but by the spin-coating process conventionally used for rigid recording disks. For this purpose, uncoated disks of base film are first produced and are then spin-coated, the process parameters being adapted to suit the nature and size of the disk.

The Examples which follow illustrate the invention; the Comparative Experiments illustrate the advance in the art achieved by the present invention.

EXAMPLE 1

A mixture of 35,000 parts of acicular gamma-iron(III) oxide, of average particle length from 0.2 to 1 $\mu$m, 4,200 parts of a 50% strength solution of a commercial polycondensate of 2,2,-(hydroxyphenyl)-propane and epichlorohydrin, having a melting point of about 125° to 135° C. and an epoxy equivalent weight of about 1,9000 to 2,500, in a mixture of 70% of cyclohexanol and 30% of xylene, 85 parts of a commercial polysiloxane solution, 3,000 parts of toluene and 260 parts of hexanone is dispersed for 40 hours in a porcelain ball mill having a capacity of 30,000 parts by volume and containing 18,000 parts of steatite balls. After adding 700 parts of a commercial curable allyloxybenzene/formaldehyde condensate having a molecular weight of about 320, 640 parts of a melamine/formaldehyde condensate in the form of a 55% strength solution in a mixture of equal parts of n-butanol and xylene, 500 parts of a 70% strength solution of a polyvinyl methyl ether in toluene and 6,000 parts of a mixture of equal parts of hexanone, toluene and butyrolactone, the mixture is dispersed for a further 15 hours. Shortly before the end of this treatment, 660 parts of fused alumina paste are added; finally, the dispersion is filtered through a filter paper of 5 μm, pore size.

To produce the magnetic coating, the dispersion is applied, by the process described in German Pat. No. 2,157,650, to both sides of previously cleaned aluminum disks rotating in an inclined position. The excess magnetic dispersion is spun off by raising the speed of rotation of the disk, and a uniform coating free from radial striations is obtained on each side of the base disk. After the solvent has evaporated and the layer has solidified, a further magnetic layer is applied in a similar manner. In this case, however, a circular magnetic field is applied using the apparatus described in U.S. Pat. No. 4,001,463 whilst the magnetic layers are still fluid, thus causing the acicular gamma-iron(III) oxide particles to form themselves into a pattern of concentric circles.

Each of the two layers is 3 μm thick, i.e. the total thickness of the magnetic coating is 6 μm. Measurement of the orientation ratio, i.e. the ratio of the remanent magnetization in the recording direction to that in the crosswise direction gives a value of 2.5 for the upper layer, whilst the lower layer is magnetically isotropic.

EXAMPLES 2 to 5

Magnetic storage disks having an unoriented lower layer and an oriented upper layer are produced in the manner described in Example 1, the total thickness d being respectively 1, 2, 3 and 4 μm in Examples 2, 3, 4 and 5.

Figure 1:
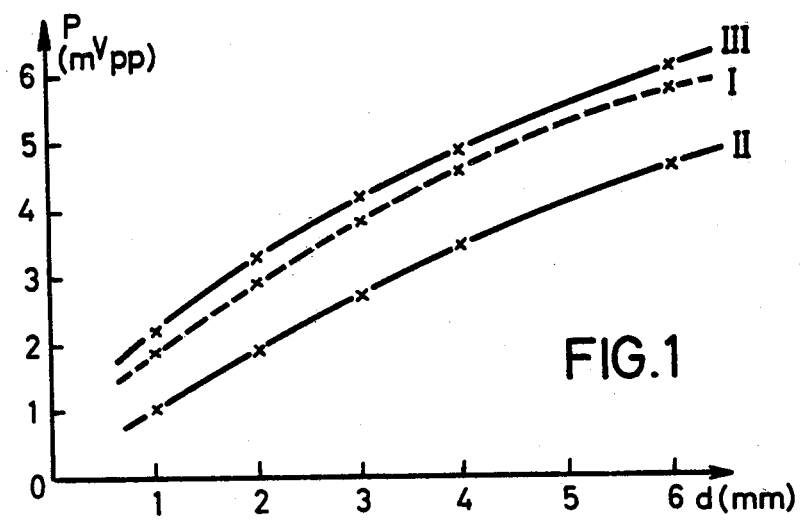
FIGS. 1 and 2 are graphs showing results obtained with examples 1-5 (Curve I) and comparative examples 1-5 (Curve II) and comparative examples 6-10 (Curve III) which are described below.
Figure 2:
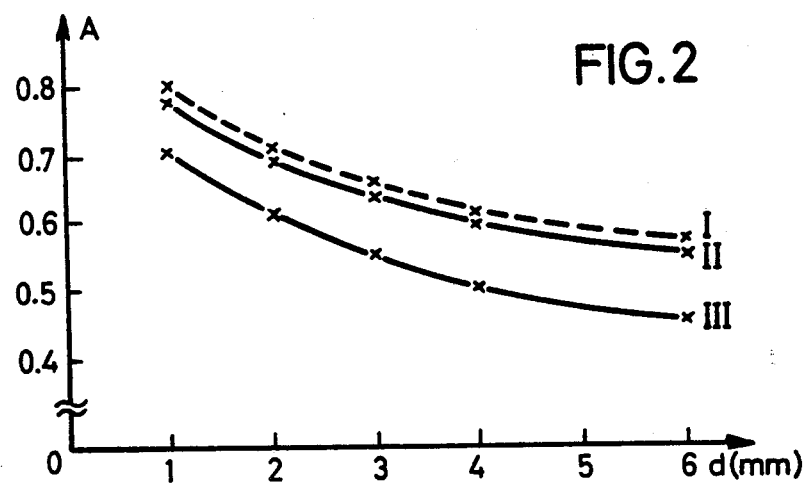

Flux changes at a frequency of $2.4 \times 10^6$ changes per second (1F signal) and of $4.8 \times 10^6$ changes per second (2F signal) are recorded on the magnetic disks of Examples 1 to 5, with the disk rotating at 3,600 rpm. The level P of the 2F read signal and the resolution A, i.e the ratio of the 2F read signal level to the 1F read signal level, is measured on a recording track of 165 mm radius. The results obtained are represented by curve I in FIGS. 1 and 2.

COMPARATIVE EXPERIMENTS 1 to 5

Magnetic storage disks are produced by the method described in Example 1, but with only an unoriented magnetic layer, the thickness of the layer being 1, 2, 3, 4 and 6 μm respectively.

The P and A values are measured on these magnetic disks. The results are represented by curve II in FIGS. 1 and 2.

COMPARATIVE EXPERIMENTS 6 to 10

Magnetic storage disks are produced as described in Example 1, but only a single layer is applied and this is oriented magnetically as described in Example 1. The thickness of the layer on the individual disks is again 1, 2, 3, 4 and 6 μm respectively. An orientation ratio of 2.5 is achieved by appropriately adjusting the magnetic field acting on the magnetic layer whilst the latter is still fluid.

The P and A values are measured on these magnetic disks in the manner already described. The results are represented by curve III in FIGS. 1 and 2.

We claim:

1. A magnetic recording disk comprising a non-magnetic substrate and at least two firmly adhering magnetizable layers applied to one or both sides thereof, wherein the layer located directly on the substrate is magnetically isotropic and exhibits a random orientation with no magnetic preferred direction, whilst the second layer exhibits orientation of the anisotropic magnetic particles parallel to the substrate and parallel to the envisaged recording direction, such that relatively low frequency signals are magnetically, longitudinally stored predominantly within the isotropic layer whereas relatively high frequency signals are magnetically, longitudinally stored predominantly within the anisotropic layer.

2. A disk as claimed in claim 1 wherein there is provided a plurality of anisotropic layers having orientation ratios improving upwardly from layer to layer.

3. A disk as claimed in claim 1 or 2 wherein said layers consist essentially of magnetic materials finely dispersed in a polymeric binder with conventional additives and such that said magnetic particles contained in said magnetic material are circularly oriented parallel to the plane of the substrate.

* * * * *